(12) United States Patent
Zhang et al.

(10) Patent No.: US 6,381,266 B1
(45) Date of Patent: Apr. 30, 2002

(54) METHOD AND APPARATUS FOR IDENTIFYING THE ENCODING TYPE OF A CENTRAL OFFICE CODEC

(75) Inventors: Xuming Zhang, Mission Viejo; Zhenyu Zhou, Irvine, both of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/164,155

(22) Filed: Sep. 30, 1998

(51) Int. Cl.$^7$ .......................... H04L 5/16; H04B 14/06; H04B 1/38
(52) U.S. Cl. ........................................ 375/222; 375/249
(58) Field of Search ................................. 375/222, 286, 375/249; 370/58, 79, 110.1

(56) References Cited

U.S. PATENT DOCUMENTS

| | | | | |
|---|---|---|---|---|
| 4,021,652 A | * | 5/1977 | Munter | 708/208 |
| 4,403,322 A | * | 9/1983 | Kato et al. | 37/110 |
| 4,507,792 A | * | 3/1985 | Yamakido et al. | 375/249 |
| 4,661,946 A | * | 4/1987 | Takahasi et al. | 370/58 |
| 4,819,253 A | * | 4/1989 | Petruschka | 375/249 |
| 5,243,342 A | * | 9/1993 | Klattemalavadi et al. | 341/106 |
| 5,311,578 A | * | 5/1994 | Bremer et al. | 379/97 |
| 5,497,373 A | * | 3/1996 | Hulen et al. | 370/79 |
| 5,793,809 A | | 8/1998 | Holmquist | |
| 5,825,823 A | * | 10/1998 | Goldstein et al. | 375/286 |
| 5,887,027 A | * | 3/1999 | Cohen et al. | 375/222 |
| 6,034,991 A | * | 3/2000 | Zhou et al. | 375/222 |

FOREIGN PATENT DOCUMENTS

| | | |
|---|---|---|
| EP | 0564143 A | 10/1993 |
| EP | 0664638 A | 7/1995 |
| WO | WO98/38752 | 9/1998 |

OTHER PUBLICATIONS

Ender Ayanoglu, Nuri R. Dagderviren, Glenn D. Golden, and James E. Mazo, An Equalizer Design Technic for the PCM Modem: A New Modem for the Digital Public switched Network. Nov. 1997 IEEE, pp. 763–774.*
Pulse Code Modulation (PCM) of Voice Frequencies, General Aspects of Digital Transmission Systems, Terminal Equipments, International Telecommunication Union—Telecommunication Standardization Sector of ITU, G.711 (1993).

* cited by examiner

*Primary Examiner*—Chi Pham
*Assistant Examiner*—Tony Al-Beshrawi
(74) *Attorney, Agent, or Firm*—Farjami & Farjami LLP

(57) ABSTRACT

A technique for identifying the encoding law utilized by a central office codec may be implemented in a receive modem. The encoding law, which is typically dictated by the country in which the central office is located, is employed to generate a plurality of transmission levels during an initialization period associated with the modem system. The receive modem analyzes a number of these transmission levels to determine whether the levels have certain characteristics associated with the particular encoding law followed by the central office codec. When the receive modem detects the codec type, it may transmit a suitable identifier back to the transmit modem.

36 Claims, 9 Drawing Sheets

FIG. 6-1

The universal set of PCM codewords

| Ucode | μ-law PCM | μ-law linear | A-law PCM | A-law linear |
|---|---|---|---|---|
| 0 | FF | 0 | D5 | 8 |
| 1 | FE | 8 | D4 | 24 |
| 2 | FD | 16 | D7 | 40 |
| 3 | FC | 24 | D6 | 56 |
| 4 | FB | 32 | D1 | 72 |
| 5 | FA | 40 | D0 | 88 |
| 6 | F9 | 48 | D3 | 104 |
| 7 | F8 | 56 | D2 | 120 |
| 8 | F7 | 64 | DD | 136 |
| 9 | F6 | 72 | DC | 152 |
| 10 | F5 | 80 | DF | 168 |
| 11 | F4 | 88 | DE | 184 |
| 12 | F3 | 96 | D9 | 200 |
| 13 | F2 | 104 | D8 | 216 |
| 14 | F1 | 112 | DB | 232 |
| 15 | F0 | 120 | DA | 248 |
| 16 | EF | 132 | C5 | 264 |
| 17 | EE | 148 | C4 | 280 |
| 18 | ED | 164 | C7 | 296 |
| 19 | EC | 180 | C6 | 312 |
| 20 | EB | 196 | C1 | 328 |
| 21 | EA | 212 | C0 | 344 |
| 22 | E9 | 228 | C3 | 360 |
| 23 | E8 | 244 | C2 | 376 |
| 24 | E7 | 260 | CD | 392 |
| 25 | E6 | 276 | CC | 408 |
| 26 | E5 | 292 | CF | 424 |
| 27 | E4 | 308 | CE | 440 |
| 28 | E3 | 324 | C9 | 456 |
| 29 | E2 | 340 | C8 | 472 |
| 30 | E1 | 356 | CB | 488 |
| 31 | E0 | 372 | CA | 504 |
| 32 | DF | 396 | F5 | 528 |
| 33 | DE | 428 | F4 | 560 |
| 34 | DD | 460 | F7 | 592 |
| 35 | DC | 492 | F6 | 624 |
| 36 | DB | 524 | F1 | 656 |
| 37 | DA | 556 | F0 | 688 |
| 38 | D9 | 588 | F3 | 720 |
| 39 | D8 | 620 | F2 | 752 |
| 40 | D7 | 652 | FD | 784 |
| 41 | D6 | 684 | FC | 816 |
| 42 | D5 | 716 | FF | 848 |
| 43 | D4 | 748 | FE | 880 |
| 44 | D3 | 780 | F9 | 912 |
| 45 | D2 | 812 | F8 | 944 |
| 46 | D1 | 844 | FB | 976 |
| 47 | D0 | 876 | FA | 1008 |
| 48 | CF | 924 | E5 | 1056 |
| 49 | CE | 988 | E4 | 1120 |
| 50 | CD | 1052 | E7 | 1184 |
| 51 | CC | 1116 | E6 | 1248 |
| 52 | CB | 1180 | E1 | 1312 |
| 53 | CA | 1244 | E0 | 1376 |
| 54 | C9 | 1308 | E3 | 1440 |
| 55 | C8 | 1372 | E2 | 1504 |
| 56 | C7 | 1436 | ED | 1568 |
| 57 | C6 | 1500 | EC | 1632 |
| 58 | C5 | 1564 | EF | 1696 |
| 59 | C4 | 1628 | EE | 1760 |
| 60 | C3 | 1692 | E9 | 1824 |
| 61 | C2 | 1756 | E8 | 1888 |
| 62 | C1 | 1820 | EB | 1952 |
| 63 | C0 | 1884 | EA | 2016 |

FIG. 6-2

The universal set of PCM codewords

| Ucode | μ-law PCM | μ-law linear | A-law PCM | A-law linear | | |
|---|---|---|---|---|---|---|
| 64 | BF | 1980 | 95 | 2112 | 0 | |
| 65 | BE | 2108 | 94 | 2240 | | |
| 66 | BD | 2236 | 97 | 2368 | | |
| 67 | BC | 2364 | 96 | 2496 | | |
| 68 | BB | 2492 | 91 | 2624 | | |
| 69 | BA | 2620 | 90 | 2752 | 5 | |
| 70 | B9 | 2748 | 93 | 2880 | | |
| 71 | B8 | 2876 | 92 | 3008 | | 4 |
| 72 | B7 | 3004 | 9D | 3136 | | |
| 73 | B6 | 3132 | 9C | 3264 | | |
| 74 | B5 | 3260 | 9F | 3392 | 10 | |
| 75 | B4 | 3388 | 9E | 3520 | | |
| 76 | B3 | 3516 | 99 | 3648 | | |
| 77 | B2 | 3644 | 98 | 3776 | | |
| 78 | B1 | 3772 | 9B | 3904 | | |
| 79 | B0 | 3900 | 9A | 4032 | 15 | |
| 80 | AF | 4092 | 85 | 4224 | 0 | |
| 81 | AE | 4348 | 84 | 4480 | | |
| 82 | AD | 4604 | 87 | 4736 | | |
| 83 | AC | 4860 | 86 | 4992 | | |
| 84 | AB | 5116 | 81 | 5248 | | |
| 85 | AA | 5372 | 80 | 5504 | 5 | |
| 86 | A9 | 5628 | 83 | 5760 | | |
| 87 | A8 | 5884 | 82 | 6016 | | 5 |
| 88 | A7 | 6140 | 8D | 6272 | | |
| 89 | A6 | 6396 | 8C | 6528 | | |
| 90 | A5 | 6652 | 8F | 6784 | 10 | |
| 91 | A4 | 6908 | 8E | 7040 | | |
| 92 | A3 | 7164 | 89 | 7296 | | |
| 93 | A2 | 7420 | 88 | 7552 | | |
| 94 | A1 | 7676 | 8B | 7808 | | |
| 95 | A0 | 7932 | 8A | 8064 | 15 | |
| 96 | 9F | 8316 | B5 | 8448 | 0 | |
| 97 | 9E | 8828 | B4 | 8960 | | |
| 98 | 9D | 9340 | B7 | 9472 | | |
| 99 | 9C | 9852 | B6 | 9984 | | |
| 100 | 9B | 10364 | B1 | 10496 | | |
| 101 | 9A | 10876 | B0 | 11008 | 5 | |
| 102 | 99 | 11388 | B3 | 11520 | | |
| 103 | 98 | 11900 | B2 | 12032 | | 6 |
| 104 | 97 | 12412 | BD | 12544 | | |
| 105 | 96 | 12924 | BC | 13056 | | |
| 106 | 95 | 13436 | BF | 13568 | 10 | |
| 107 | 94 | 13948 | BE | 14080 | | |
| 108 | 93 | 14460 | B9 | 14592 | | |
| 109 | 92 | 14972 | B8 | 15104 | | |
| 110 | 91 | 15484 | BB | 15616 | | |
| 111 | 90 | 15996 | BA | 16128 | 15 | |
| 112 | 8F | 16764 | A5 | 16896 | 0 | |
| 113 | 8E | 17788 | A4 | 17920 | | |
| 114 | 8D | 18812 | A7 | 18944 | | |
| 115 | 8C | 19836 | A6 | 19968 | | |
| 116 | 8B | 20860 | A1 | 20992 | | |
| 117 | 8A | 21884 | A0 | 22016 | 5 | |
| 118 | 89 | 22908 | A3 | 23040 | | |
| 119 | 88 | 23932 | A2 | 24064 | | 7 |
| 120 | 87 | 24956 | AD | 25088 | | |
| 121 | 86 | 25980 | AC | 26112 | | |
| 122 | 85 | 27004 | AF | 27136 | 10 | |
| 123 | 84 | 28028 | AE | 28160 | | |
| 124 | 83 | 29052 | A9 | 29184 | | |
| 125 | 82 | 30076 | A8 | 30208 | | |
| 126 | 81 | 31100 | AB | 31232 | | |
| 127 | 80 | 32124 | AA | 32256 | 15 | |

A-law, positive input values

| 1 | 2 | 3 | 4 | 5 | 6 | 7 | 8 |
|---|---|---|---|---|---|---|---|
| Segment number | Number of intervals x interval size | Value at segment end points | Decision value number $n$ | Decision value $x_n$ (see Note 1) | Character signal before inversion of the even bits<br>Bit number<br>1 2 3 4 5 6 7 8 | Quantized value (value at decoder output) $y_n$ | Decoder output value number |
| | | 4096 | (128) | (4096) | | | |
| | | | | | 1 1 1 1 1 1 1 1 | 4032 | 128 |
| | | | 127 | 3968 | | | |
| 7 | 16 x 128 | | | | (see Note 2) | | |
| | | | 113 | 2176 | | | |
| | | | | | 1 1 1 1 0 0 0 0 | 2112 | 113 |
| | | 2048 | 112 | 2048 | | | |
| | | | | | (see Note 2) | | |
| 6 | 16 x 64 | | 97 | 1088 | | | |
| | | | | | 1 1 1 0 0 0 0 0 | 1056 | 97 |
| | | 1024 | 96 | 1024 | | | |
| | | | | | (see Note 2) | | |
| 5 | 16 x 32 | | 81 | 544 | | | |
| | | | | | 1 1 0 1 0 0 0 0 | 528 | 81 |
| | | 512 | 80 | 512 | | | |
| | | | | | (see Note 2) | | |
| 4 | 16 x 16 | | 65 | 272 | | | |
| | | | | | 1 1 0 0 0 0 0 0 | 264 | 65 |
| | | 256 | 64 | 256 | | | |
| | | | | | (see Note 2) | | |
| 3 | 16 x 8 | | 49 | 136 | | | |
| | | | | | 1 0 1 1 0 0 0 0 | 132 | 49 |
| | | 128 | 48 | 128 | | | |
| | | | | | (see Note 2) | | |
| 2 | 16 x 4 | | 33 | 68 | | | |
| | | | | | 1 0 1 0 0 0 0 0 | 66 | 33 |
| | | 64 | 32 | 64 | | | |
| | | | | | (see Note 2) | | |
| 1 | 32 x 2 | | | | | | |
| ↓ | | | | | | | |
| 0 | | | 1 | 2 | | | |
| | | | | | 1 0 0 0 0 0 0 0 | 1 | 1 |
| | | | 0 | 0 | | | |

FIG. 7

FIG. 8    μ-A conversion

| μ-law Decoder output value number | A-law Decoder output value number | μ-law Decoder output value number | A-law Decoder output value number |
|---|---|---|---|
| 0 | 1 | 44 | 41 |
| 1 | 1 | 45 | 42 |
| 2 | 2 | 46 | 43 |
| 3 | 2 | 47 | 44 |
| 4 | 3 | 48 | 46 |
| 5 | 3 | 49 | 48 |
| 6 | 4 | 50 | 49 |
| 7 | 4 | 51 | 50 |
| 8 | 5 | 52 | 51 |
| 9 | 5 | 53 | 52 |
| 10 | 6 | 54 | 53 |
| 11 | 6 | 55 | 54 |
| 12 | 7 | 56 | 55 |
| 13 | 7 | 57 | 56 |
| 14 | 8 | 58 | 57 |
| 15 | 8 | 59 | 58 |
| 16 | 9 | 60 | 59 |
| 17 | 10 | 61 | 60 |
| 18 | 11 | 62 | 61 |
| 19 | 12 | 63 | 62 |
| 20 | 13 | 64 | 64 |
| 21 | 14 | 65 | 65 |
| 22 | 15 | 66 | 66 |
| 23 | 16 | 67 | 67 |
| 24 | 17 | 68 | 68 |
| 25 | 18 | 69 | 69 |
| 26 | 19 | 70 | 70 |
| 27 | 20 | 71 | 71 |
| 28 | 21 | 72 | 72 |
| 29 | 22 | 73 | 73 |
| 30 | 23 | 74 | 74 |
| 31 | 24 | 75 | 75 |
| 32 | 25 | 76 | 76 |
| 33 | 27 | 77 | 77 |
| 34 | 29 | 78 | 78 |
| 35 | 31 | 79 | 79 |
| 36 | 33 | 80 | 81 |
| 37 | 34 | 81 | 82 |
| 38 | 35 | 82 | 83 |
| 39 | 36 | 83 | 84 |
| 40 | 37 | 84 | 85 |
| 41 | 38 | 85 | 86 |
| 42 | 39 | 86 | 87 |
| 43 | 40 | 87 | 88 |
| ⋮ | ⋮ | ⋮ | ⋮ |
|  |  | 127 | 128 |

METHOD AND APPARATUS FOR IDENTIFYING THE ENCODING TYPE OF A CENTRAL OFFICE CODEC

FIELD OF THE INVENTION

The present invention relates generally to digital data communication systems, e.g., modem systems. More particularly, the present invention relates to a technique for determining, at a receive modem, the encoding type of a central office codec.

BACKGROUND OF THE INVENTION

The use of pulse code modulation (PCM) techniques in the context of digital communication systems is generally well known. For example, PCM encoding schemes have been utilized in connection with the public switched telephone network (PSTN) for many years to enable the encoding of voiceband signals. An internationally standardized PCM encoding protocol is set forth in ITU-T Recommendation G.711 (International Telecommunication Union, 1993). Recommendation G.711 contains the $\mu$-law encoding scheme, which is utilized in the United States (and other countries), and the A-law encoding scheme, which is utilized in European and other countries. The entire content of ITU-T Recommendation G.711 is incorporated herein by reference.

PCM modems, such as 56 kbps modem systems compliant with ITU-T Recommendation V.90 (International Telecommunication Union, 1998), generally rely on the transmission and receipt of codewords or levels utilized by the $\mu$-law or A-law encoding schemes (the entire content of ITU-T Recommendation V.90 is incorporated herein by reference). Due to the use of different standardized encoding schemes, a given end-to-end communication channel may be associated with a transmit modem located in one country and a receive modem located in a different country. Accordingly, the, transmit-receive communication channel may be designated as: (1) $\mu$-law to $\mu$-law; (2) $\mu$-law to A-law; (3) A-law to $\mu$-law; (4) A-law to A-law; or (5) a combination of thereof (e.g., where a number of different conversions are utilized).

Section 3.4 of Recommendation G.711 states that:

Digital paths between countries which have adopted different encoding laws should carry signals encoded in accordance with the A-law. Where both countries have adopted the same law, that law should be used on digital paths between them. Any necessary conversion will be done by the countries using the $\mu$-law.

Consequently, in some cross-country situations, the transmit modem codec may follow a different encoding law than the central office codec associated with the receive modem. If the actual $\mu$-law or A-law encoding levels are to be utilized by the modem system, then the central office codec type must be known to or identified by the receive or transmit modem. If the central office codec type is known or identified, then the receive modem can match its slicer levels with the particular encoding scheme to reduce the quantization noise inherent in the system. If the central office codec is known to the transmit modem, e.g., the server modem in a V.90 system, then it can use such knowledge to better adjust its echo canceler.

Although a transmit modem may transmit an identification signal (indicating its encoding law) to the receive modem, the encoding type of the central office cannot be easily ascertained from the identification signal. Accordingly, current receive modems may simply trust the identification signal and assume that the central office codec type matches the transmit modem codec type. In other words, the receive modem may not make an independent assessment of the central office codec type.

SUMMARY OF THE INVENTION

Accordingly, the present invention provides a technique for enabling a receive modem to accurately identify the encoding law utilized by a local central office codec. The codec type detection scheme is based upon the transmission levels utilized by the PSTN, regardless of whether such levels are $\mu$-law or A-law levels. The technique enables the receive modem to identify the codec type of the associated central office independent of the codec type utilized by the transmit modem.

The techniques of the present invention may be carried out in one form by a method for identifying an encoding type associated with a central office codec in a digital data communication system. The method, which may be performed by a receive modem, obtains a set of transmission levels generated in accordance with an encoding scheme utilized by the central office codec, selects a plurality of transmission levels from the set of transmission levels, and analyzes the plurality of transmission levels to determine whether characteristics of the plurality of transmission levels correspond to a specific encoding type. In the preferred embodiment, the receive modem detects whether the central office codec follows the $\mu$-law or the A-law scheme.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIG. 6 is a prior art table of PCM transmission levels as set forth in ITU-T Recommendation V.90;

FIG. 7 is a prior art table of positive A-law levels as set forth in ITU-T Recommendation G.711; and FIG. 8 is a prior art table of indices corresponding to a $\mu$-law to A-law conversion scheme as set forth in ITU-T Recommendation G.711.

DETAILED DESCRIPTION OF A PREFERRED EXEMPLARY EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, look-up tables, and the like, which may carry out a variety of functions under the control of one or more microprocessors or other control devices. In addition, those skilled in the art will appreciate that the present invention may be practiced in any number of data communication contexts and that the modem system described herein is merely one exemplary application for the invention. Further, it should be noted that the present invention may employ any number of conventional techniques for data transmission, training, signal processing and conditioning, and the like. For example, DIGITAL COMMUNICATION, by Lee & Messerschmitt (2nd ed., 1996), contains detailed descriptions of many such techniques (the entire content of this publication is hereby incorporated by reference). Such general techniques and others that may be known to those skilled in the art are not described in detail herein.

Figure 1:
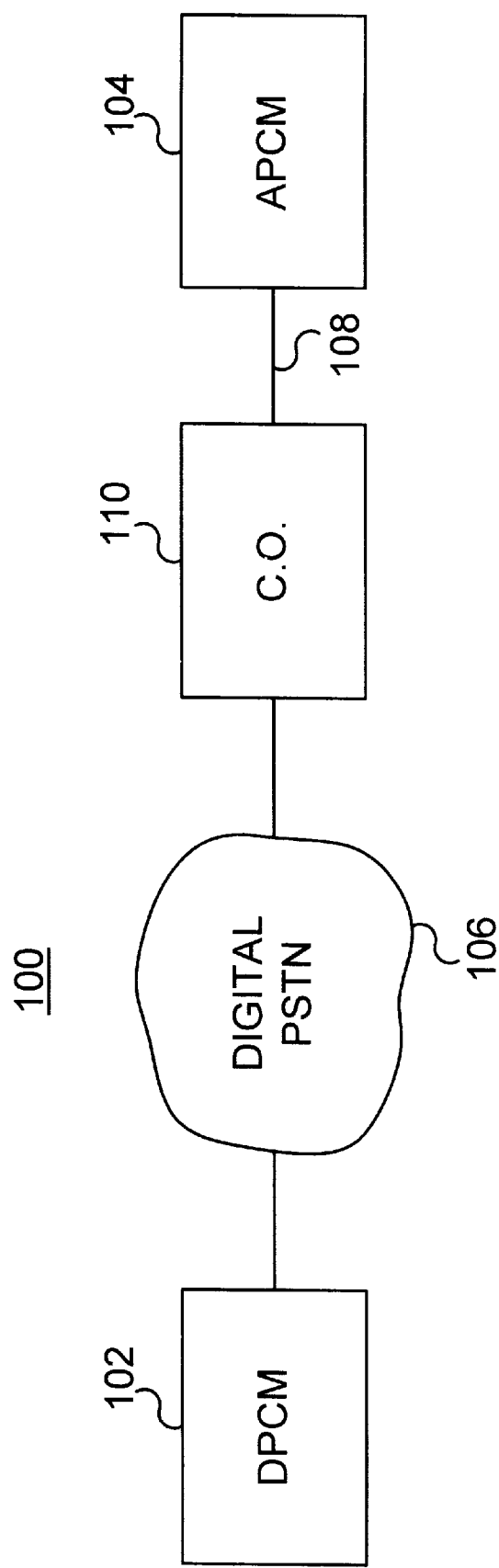
FIG. 1 is a schematic representation of a typical prior art modem system arrangement in which the techniques of the present invention may be implemented.
Figure 2:
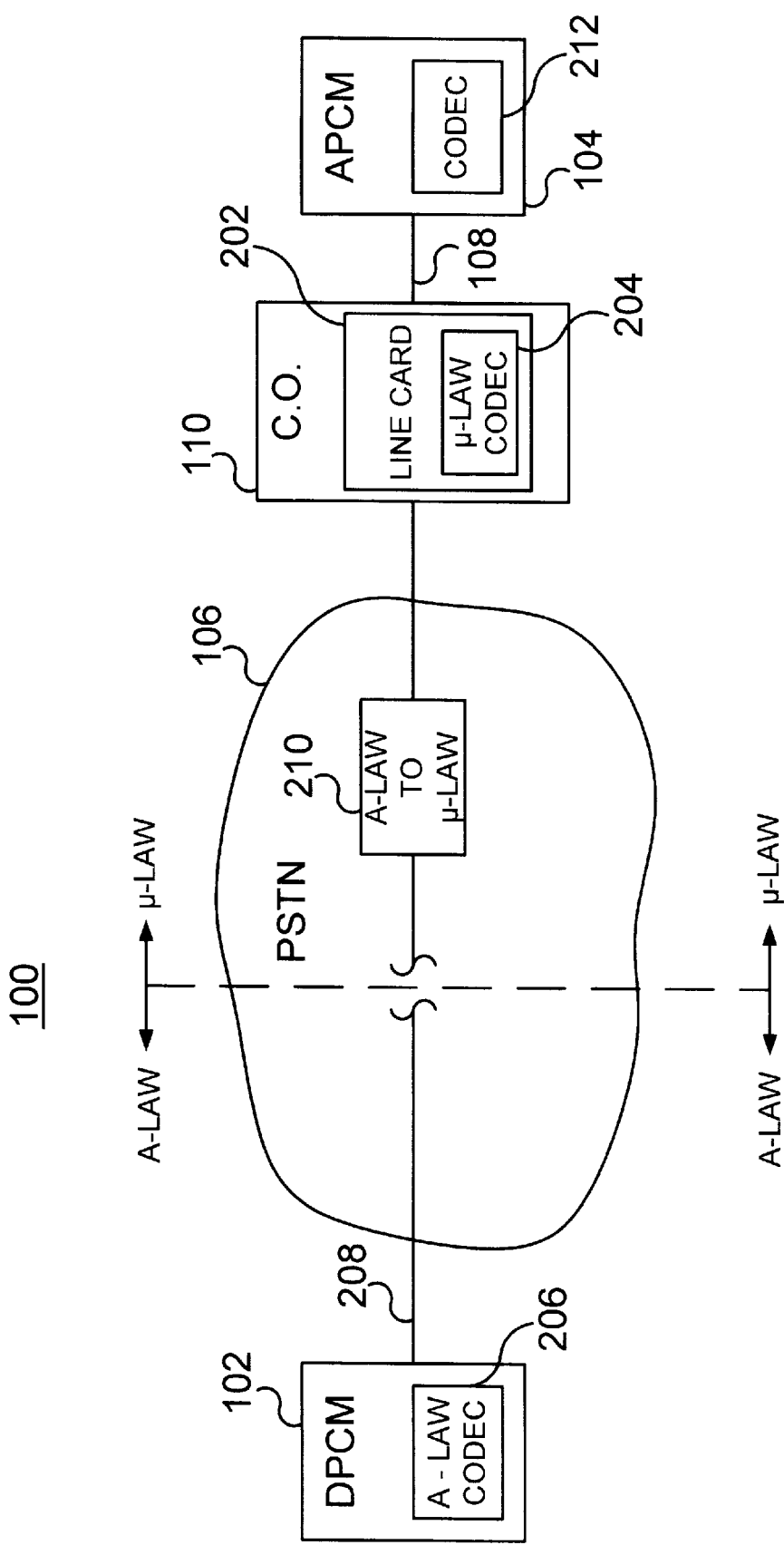
FIG. 2 is a detailed schematic representation of the prior art modem system arrangement shown in FIG. 1.

FIG. 1 depicts a conceptual diagram of a typical V.90 compliant modem system 100, and FIG. 2 shows a more detailed representation of modem system 100. V.90 modems may achieve end-to-end data rates of up to 56 kbps using current pulse code modulation (PCM) techniques. Generally, modem system 100 includes a server modem 102 and a client modem 104. In accordance with conventional terminology, modem 102 is labeled "DPCM modem" to indicate that it is the digital pulse code modulation modem device in the system. Similarly, modem 104 is labeled "APCM modem" to indicate that it is the analog pulse code modulation modem device. Modem 102 is digitally connected to a digital telephone network 106, e.g., the PSTN, while modem 104 is connected to digital telephone network 106 via an analog local loop 108. The digital connection to digital telephone network 106 enables modem 102 to transmit outgoing data to digital telephone network 106 at 64 kbps.

Digital telephone network 106 is connected to local loop 108 through a central office 110, which may include a number of individual line cards 202 (see FIG. 2) associated therewith. Such line cards typically have PCM codecs implemented therein. In the exemplary system shown in FIG. 2, line card 202 includes a central office codec that is compliant with ITU-T Recommendation G.711, e.g., a $\mu$-law codec 204. Accordingly, central office 110 resides in a $\mu$-law country. Since the parameters of digital telephone network 106 and the line cards are dictated and set by the operating specifications of the network (and particularly the use of the $\mu$-law or A-law signal point constellations), modem 102 is preferably configured to transmit the digital data in a particular way to fully exploit its digital connection to digital telephone network 106.

Modem 102 and modem 104 are also depicted in schematic block diagram form in FIG. 2. Although the general architecture shown in FIG. 2 may be shared with prior art modem systems, the techniques of the present invention may be incorporated in such an architecture. DPCM modem 102 preferably includes, or is operatively associated with, a codec 206. For the sake of illustration, codec 206 is labeled as an A-law codec. In a practical modem system, DPCM 102 may include a hybrid codec that is capable of switching from $\mu$-law to A-law encoding, depending upon the particular application and/or the current operating conditions of modem system 100. Codec 206 may generate digital codewords that represent the actual A-law levels or scaled levels that follow the A-law signal point spacing or slope paradigm.

The digital codewords generated by codec 206 are transmitted through PSTN 106 via a digital communication link 208. In accordance with the illustrated example (e.g., a downstream channel from an A-law country to a $\mu$-law country), an A-law to $\mu$-law conversion 210 is eventually performed. In compliance with Recommendation G.711, the A-law to $\mu$-law conversion 210 occurs in the $\mu$-law country. In a practical system, the A-law to $\mu$-law conversion 210 may be implemented in a repeater or a switch (not shown) associated with PSTN 106; a practical system may also include any number of A-law to $\mu$-law conversion elements or $\mu$-law to A-law conversion elements. FIG. 8 is a table of index values associated with $\mu$-law and A-law values, and the corresponding conversion scheme from $\mu$-law to A-law. The relevance of the index values and the conversion table of FIG. 8 are described in more detail below.

As described above, central office codec 204 eventually follows the encoding law utilized in its locale. Accordingly, codec 204 may follow a $\mu$-law encoding scheme, as depicted in FIG. 2. APCM 104 preferably includes a linear codec 212, which may be configured for compatibility with $\mu$-law, A-law, estimated $\mu$-law, estimated A-law, or other transmission levels. Codec 212 may include a slicer/quantizer (not shown) that quantizes a sequence of digital values into a sequence of predetermined digital values. In an ideal system, the slicer or quantization levels associated with codec 212 are matched with the respective levels associated with central office codec 204.

Figure 3:
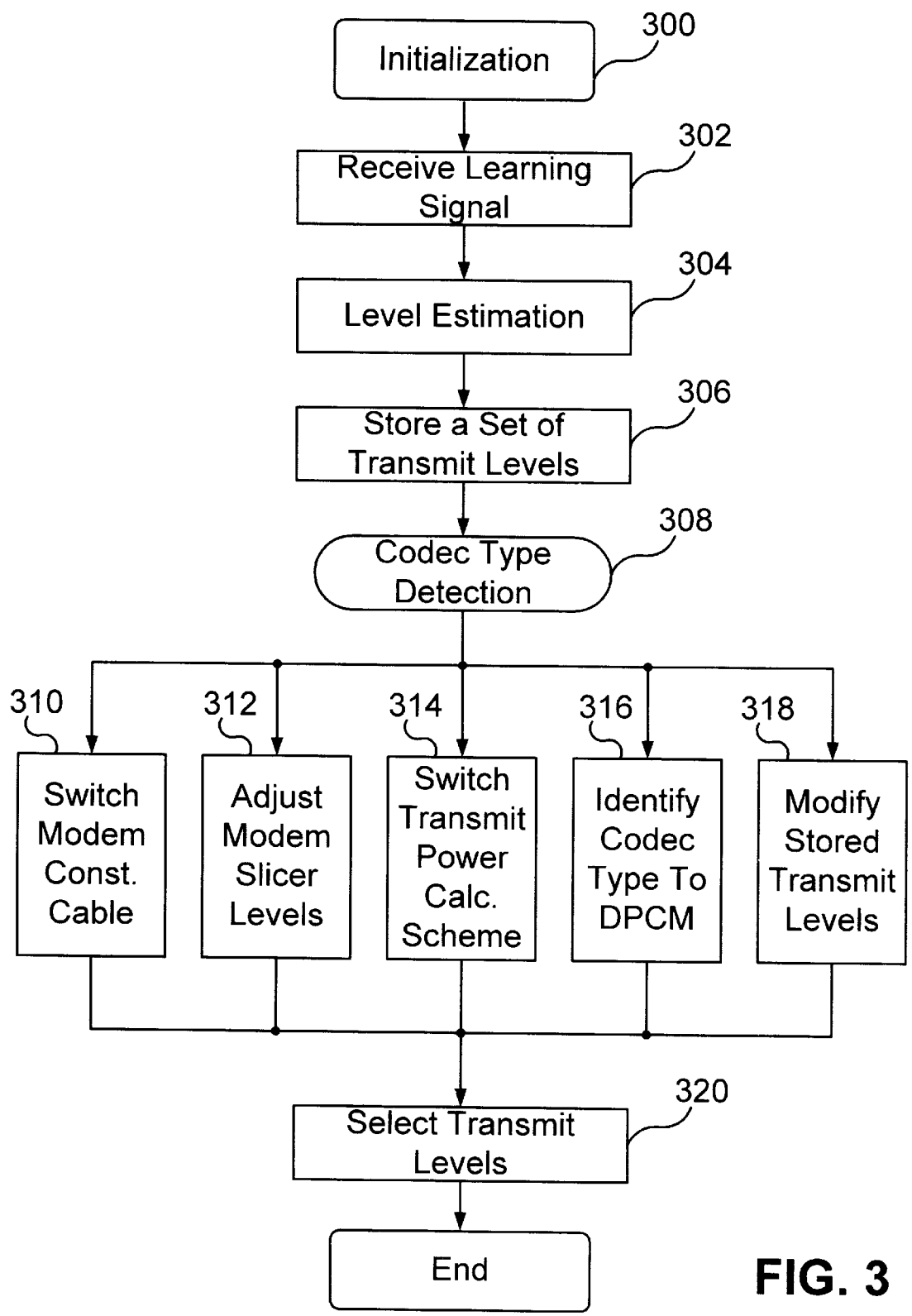
FIG. 3 is a flow diagram of an exemplary initialization process that may be performed by a modem system.
Figure 4:
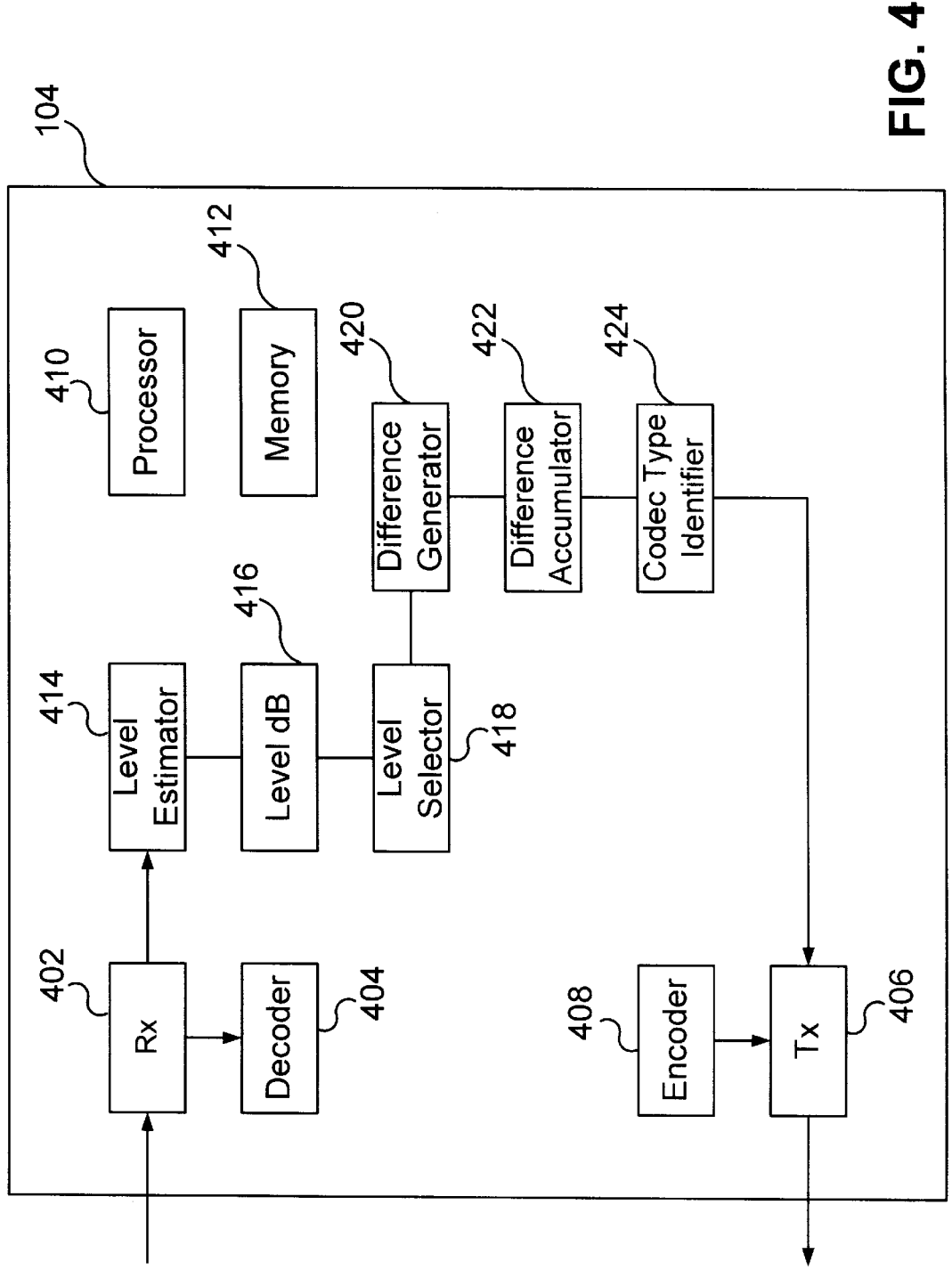
FIG. 4 is a schematic representation of an exemplary receive modem.

As described above, modem 104 may be configured in accordance with the preferred embodiment of the present invention such that it can detect and identify the specific encoding law utilized by central office codec 204. Modem 104 is preferably configured to perform an initialization process 300, as depicted in FIG. 3. FIG. 4 is a schematic block diagram of modem 104 as configured in accordance with the present invention. In accordance with the exemplary embodiment described herein, modem 104 may be employed in a V.90 modem system. It should be appreciated that the particular implementation shown in FIG. 4 and described herein is merely exemplary and is not intended to limit the scope of the present invention in any way. Indeed, for the sake of brevity, conventional timing recovery, equalization, automatic gain control (AGC), synchronization, training, encoding, decoding, and other functional aspects of modem 104 (and other items described herein) may not described in detail herein. Furthermore, the connecting lines shown in FIG. 4 and other figures contained herein are intended to represent exemplary functional relationships and/or physical couplings between the various elements. It should be noted that many alternative or additional functional relationships or physical connections may be present in a practical communication system.

Initialization process 300 is preferably performed by modem 104 prior to the normal transmission of data, i.e., prior to the conventional tracking mode. Process 300 will be described herein with reference to both FIG. 3 and FIG. 4. Modem 104 generally includes a receiver 402, a decoder 404, a transmitter 406, an encoder 408, a processor 410, and a memory element 412. Processor 410 may be any suitable component or device capable of performing, monitoring, and/or regulating the necessary digital and analog processes carried out by modem 104. Processor 410 may be a suitable digital signal processor or other device having a sufficient amount of processing power. Memory element 412 is preferably sized to enable modem 104 to efficiently store, manage, manipulate, and process data in an appropriate manner. Processor 410 and memory element 412 may be realized by any number of commercially available or otherwise conventional components.

Initialization process 300 preferably begins with a task 302, during which modem 104 receives a learning signal from modem 102. In the context of a V.90 compliant modem system, task 302 may be associated with a digital impairment learning (DIL) signal transmitted by modem 102. The DIL sequence includes a plurality of known transmission points (e.g., each transmission level associated with the particular encoding law) and reference points; modem 104 analyzes the received learning signal to obtain information regarding the characteristics of the downstream communication channel. In response to the learning signal, a level estimator 414 obtains a set of estimated transmission levels (which may be contaminated by noise and uncompensated line distortions) that were generated in accordance with the encoding scheme utilized by central office codec 204 (task 304). In the preferred embodiment, each transmission level contained in the set is associated with a codeword utilized by the particular encoding scheme. For example, level estimator 414 may perform any number of known techniques to suitably obtain a set of estimated levels corresponding to the $\mu$-law or A-law levels.

In the preferred embodiment, level estimator 414 obtains 128 levels in accordance with the processing of the learning sequence. These 128 levels may either be the $\mu$-law levels, the A-law levels, estimations thereof, or scaled versions thereof. These levels are often corrupted by noise and unequalized channel distortions. For example, FIG. 6 is a table of the linear $\mu$-law values and the linear A-law values (as contained in Recommendation V.90), and FIG. 7 is a chart showing the linear A-law values (as contained in Recommendation G.711). Column seven of FIG. 7 indicates the progression of the standard linear A-law values, and the linear A-law values listed in FIG. 6 are the standard values multiplied by eight.

Modem 104 may include a transmit level database 416 that suitably stores and identifies the estimated levels (task 306). As described above, database 416 may store any or all of the levels acquired by level estimator 414. In an alternate embodiment, database 416 may store the actual $\mu$-law or A-law levels, or scaled versions thereof as suitably processed by modem 104. The transmission levels stored in database 416 may be analyzed by modem 104 during a code type detection procedure 308 (described in detail below). As discussed above, code type detection procedure 308 is preferably performed to enable modem 104 to make an independent evaluation regarding the specific encoding scheme followed by central office codec 204.

After the encoding law followed by central office codec 204 is identified as being either $\mu$-law or A-law, modem system 100 may conduct any number of routines in response to the identification. For example, a task 310 may be performed to prompt modem 104 to suitably switch its signal point constellation table such that codec 212 and central office codec 204 are matched. A task 312 may also be performed to cause modem 104 to adjust the slicer levels associated with codec 212; the adjustment of the slicer levels may be desirable to reduce the quantization error associated with any potential mismatching between codecs.

A task 314 may also be performed to cause modem 104 to adjust the algorithms used to calculate the transmit power associated with a number of transmit levels. Task 314 is desirable to ensure that the power calculation performed by modem 104 is consistent with an equivalent power calculation performed by modem 102. Such power calculations may be performed to ensure that the transmission levels selected for data transmission do not exceed a predetermined maximum power threshold. In a preferred implementation, modem 102 verifies that modem 104 has calculated the correct transmit power prior to entering the tracking mode.

Modem 104 may perform a task 316 to inform modem 102 of the central office codec type. Task 316 may be accomplished by the transmission of a suitable identifier from modem 104 to modem 102. As described above, this technique is preferable to having modem 102 and/or modem 104 make an assumption regarding the central office codec type. Indeed, Recommendation V.90 states that the APCM modem should inform the DPCM of the central office codec type if the APCM obtains the type. In V.90, a codec identifier is transmitted as the 35th bit in the CP sequence; a "0" indicates $\mu$-law and a "1" indicates A-law. Additionally (or alternatively), a task 318 may be performed in response to the detection of the central office encoding law. Task 318 may cause modem 104 to suitably modify the stored transmission levels according to the central office encoding law. For example, task 318 may be performed if modem 104 is designed to process the actual $\mu$-law or the actual A-law levels rather than estimated levels.

A task 320 may be performed by a level selector 418 (see FIG. 4) some time after level estimation is performed in task 304. In response to the analysis of the received learning signal, task 320 preferably determines and selects a number of preferred signal points for use by modem system 100 during data transmission. Once a desired group of transmit levels is selected by modem 104, information indicative of the desired transmit levels may be sent back to modem 102. Following task 320, initialization process 300 ends. Of course, modem system 100 may perform a number of additional training and initialization procedures during an overall start-up routine.

Figure 5:
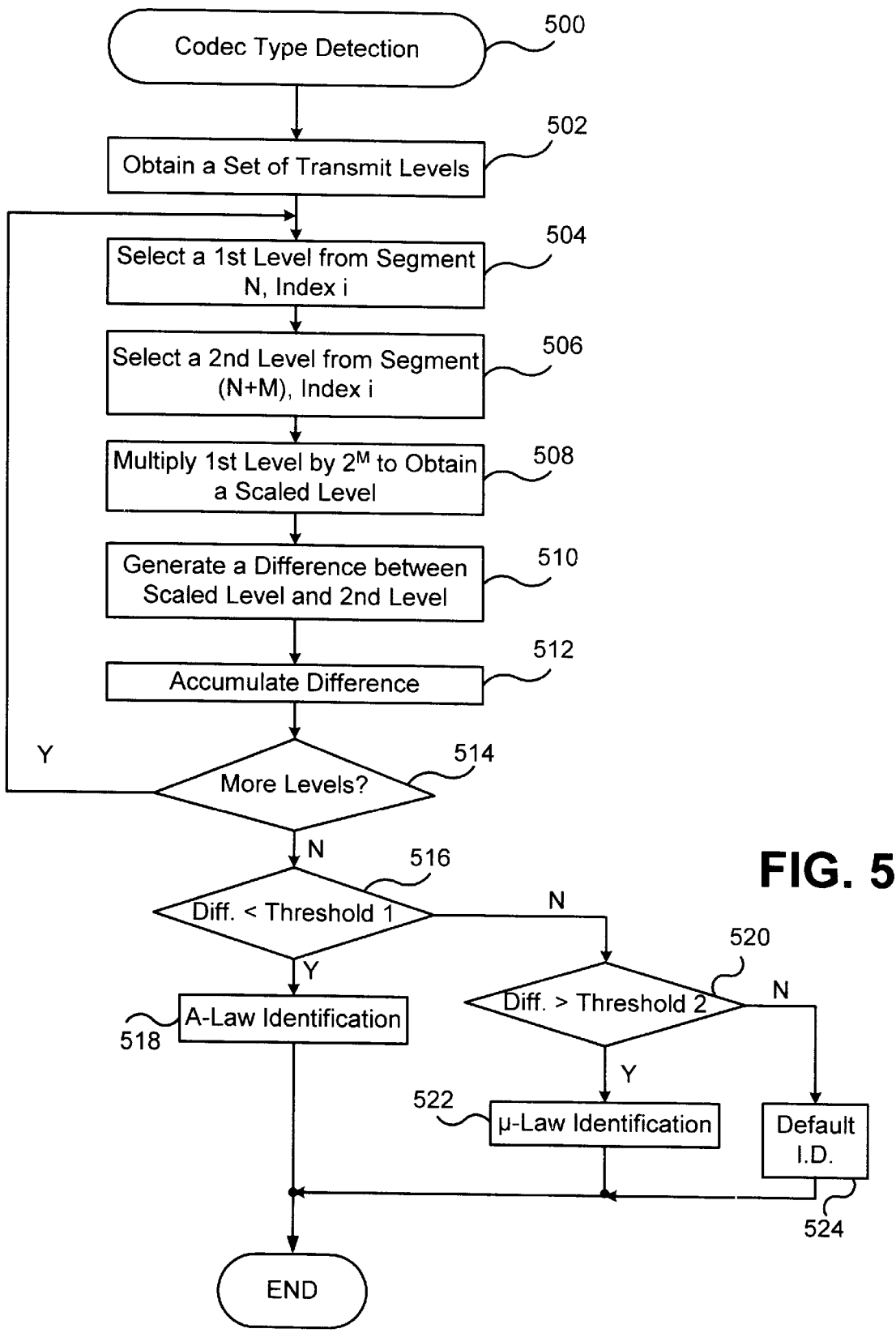
FIG. 5 is a flow diagram of an exemplary codec type detection process that may be performed by the receive modem shown in FIG. 4.

As mentioned above, modem 104 may perform a codec type detection procedure 308 during initialization process 300. FIG. 5 is a flow diagram of an exemplary codec type detection process 500 that may be utilized in the context of the present invention. As discussed above, process 500 is preferably performed after modem 104 has obtained a number of transmission levels, e.g., 128 levels based upon $\mu$-law values or 128 levels based on A-law values. Process 500 will be described herein with continued reference to FIG. 4.

Process 500 preferably begins with a task 502, which obtains a set of transmit levels procured in response to an encoding scheme utilized by a codec, e.g., central office codec 204. Task 502 may be realized as part of the line impairment learning procedure described above. Alternatively, task 502 may obtain any suitable set of levels that may be stored in, e.g., level database 416. In accordance with the preferred embodiment, each of the transmit levels may be designated by a segment index and a subindex associated with the particular segment index. Such segment indices are shown in column one of FIG. 7 in the context of A-law values, and segment indices and subindices are shown in FIG. 6 in the context of the $\mu$-law and A-law values associated with Recommendation V.90.

As shown in FIG. 6, the 128 potential transmission levels are preferably separated into eight segment indices, numbered from zero to seven. Each segment index is associated with sixteen subindices that correspond to sixteen transmit levels. Accordingly, any given transmit level may be designated in terms of a segment index N and a subindex i. With brief reference to FIG. 7, the first 32 A-law transmit levels are commonly associated with one segment index because the spacing between each of the 32 levels is the same, i.e., the linear slope for the first 32 levels is constant. However, the first 32 A-law levels may alternatively be conceptually divided into two 16-level segments. Referring again to FIG. 6, a first transmit level, e.g., linear A-law value 5504, is designated by the fifth segment index and the fifth subindex. In a practical codeword environment, this A-law value may be associated with the eight-bit word (11010101), where the most significant bit represents the sign of the level, the next three bits (101) represent the fifth segment index, and the next four bits (0101) represent the fifth subindex. As another example, linear A-law value 14080, is designated by the sixth segment index and the eleventh subindex; it may be associated with the word (11101011).

Referring again to FIG. 5 and FIG. 4, level selector 418 may also be configured to select a plurality of transmission levels from the set of transmission levels obtained during task 502. As described above, in current V.90 systems, these levels will either be based upon $\mu$-law or A-law levels. In accordance with the above indexing scheme, a task 504 is preferably performed to select a first level designated by a first segment index (N) and a subindex (i). Then, a task 506 is preferably performed to select a second level designated by a second segment index (N+M) and the same subindex (i). Tasks 504 and 506 may be realized by any number of database interrogation techniques and may utilize simple table look-up procedures.

Modem 104 may include a difference generator 420 configured to calculate a difference based on the first and second levels. Difference generator 420 (or any suitable processing element of modem 104) may be further configured to multiply the first transmission level by $2^M$ to thereby obtain a scaled level associated with the first level. Turning briefly to FIG. 5, task 508 may be suitably configured to multiply the first transmission level by $2^M$. A task 510 is preferably performed to generate the difference between the scaled transmission level and the second transmission level.

The above tasks will be described in the context of exemplary transmission levels as set forth in FIG. 6. It should be appreciated that the present invention is in no way limited to the processing of specific transmission levels. Nor is the present invention limited to the processing of any number of transmission levels. In this example, the first level is the linear A-law level 1248, which is designated by segment three, subindex three. The second level is the linear A-law level 4992, which is designated by segment five, subindex three. Accordingly, the value of M in this example is 2. The scaling operation is performed as follows: Scaled Level=$2^M$(Lower Level). For this particular example, the scaled level would be $2^2(1248)=4992$. Consequently, the difference between the scaled level and the second level is zero. If the difference is calculated from estimated levels, as in a practical system, then the difference will likely be a nonzero value that reflects the estimation error. In other words, the ideal property described above statistically holds true for A-law levels, but in a practical system, the difference will not be exactly zero.

If the $\mu$-law levels having the above segments and subindex are utilized, the difference is substantially higher. For this example, the first level is the linear $\mu$-law value 1116 and the second level is the linear $\mu$-law value 4860. If the same operation is performed, the scaled level would be $2^2(1116)=4464$. The corresponding difference between the scaled value and the second value is 396. The present invention may utilize an absolute value of the difference (if appropriate) to ensure that meaningful comparisons can be made.

The above technique may be utilized to suitably analyze the stored transmission levels to determine whether characteristics of the transmission levels correspond to a specific encoding type, e.g., $\mu$-law or A-law encoding. The difference in errors associated with A-law levels and $\mu$-law levels is a result of the characteristics of the respective encoding schemes. For example, the spacing between A-law levels doubles for each successive segment above segments zero and one; this doubling effect is not a characteristic of the $\mu$-law encoding scheme. It should be noted that, for A-law applications, the first 32 transmit levels (associated with the "first" segment) should not be selected for analysis because the scaling characteristic is not valid for the first sixteen levels.

Although the central office codec type may be identified based on one difference as calculated above, the preferred embodiment performs a plurality of calculations to ensure that a robust determination is made. For example, although a zero difference would result in an ideal analysis of A-law levels, quantization errors and other limitations of modem system 100 and PSTN 106 will often cause task 510 to generate nonzero difference. Accordingly, an exemplary embodiment may select a number, e.g., sixteen, of different levels and accumulate the magnitudes or absolute values of the differences in a difference accumulator 422 (task 512). Thus, for the initial iteration, task 512 may store the first difference value obtained by task 510 in difference accumulator 422. As stated above, if central office codec 204 is a $\mu$-law codec, then the individual difference may be substantially greater than zero; if it is an A-law codec, then the difference will likely be close to zero.

A query task 514 may test whether more transmission levels are to be analyzed during process 500. If so, then process 500 is preferably re-entered at task 504 to select new first and second levels. Thus, tasks 504, 506, 508, 510, 512 may be suitably repeated for a number of different (or the same) levels. Accordingly, each iteration of task 510 calculates an individual difference, and task 512 generates an accumulated difference by, e.g., summing the individual differences in difference accumulator 422. If query task 512 determines that no additional levels are to be analyzed, then a query task 516 may be performed.

Query task 516 may be performed by, e.g., a codec type identifier 424. Query task 516 compares whether the accumulated difference is less that a first predetermined threshold. In this example, the first threshold is selected such that an accumulated error less than the first threshold identifies that the central office encoding type is A-law (task 518). On the other hand, if query task 516 determines that the accumulated difference is not less than the first threshold, then a query task 520 may be performed. Query task 520 preferably compares whether the accumulated difference is greater than a second predetermined threshold. In this exemplary embodiment, the second threshold is suitably selected such that an accumulated error greater than the second threshold identifies that the central office encoding type is $\mu$-law (task 522). Thus, the identification of the encoding scheme is responsive to the calculation of the differences and to the comparison of the accumulated difference to the threshold values.

If query task 520 determines that the accumulated difference is not greater than the first threshold, then a task 524 may be performed to cause APCM 104 to utilize a "default" codec type identification. In a practical embodiment, task 524 may cause APCM 104 to assume that the central office codec type is the same as the codec type utilized by DPCM 102. Accordingly, the dual threshold approach is desirable to reduce the likelihood of false detection, particularly where such false detection can lead to fatal operational errors. Of course, the order of the above threshold analyses may be reversed.

The particular values of the first and second thresholds may be selected in accordance with a desired misdetection rate. In the preferred embodiment, the first and second threshold values are selected after APCM 104 determines which signal points are to be analyzed during codec type detection process 500. For example, once the particular indices of the signal points are known, then APCM 104 may calculate the "ideal" accumulated difference (error) associated with the µ-law points; this accumulated error will be a relatively large value compared to the "ideal" accumulated A-law error of zero. The ideal accumulated error for the µ-law points may be employed as a reference value upon which the two thresholds are based. In other words, the first (lower) threshold may be set at a relatively small percentage of the accumulated µ-law error, while the second (higher) threshold may be set at a relatively large percentage of the accumulated µ-law error.

In an alternate embodiment, only one threshold value may be used to facilitate a binary decision. In such an embodiment, the threshold value may be selected to be approximately half of the ideal accumulated µ-law error. Thus, if the measured accumulated difference is less than the threshold, the codec type is identified as A-law; if the measured accumulated difference is greater than the threshold, the codec type is identified as µ-law. In another alternate embodiment, rather than performing the multiply operation described above, the present invention may compare the two unscaled transmit levels and adjust the threshold values by a suitable amount that contemplates the segment indices from which the two levels are taken.

Referring to FIG. 8, it may be desirable to intelligently select certain transmit levels in a manner that facilitates an accurate detection of the central office codec type. For example, where µ-law to A-law conversion occurs, there may not be a consecutive µ-law to A-law mapping for all transmit levels. In other words, there may be some lower A-law levels designated by a subindex for which no higher A-law level is equivalently designated. In particular, with reference to FIG. 8, there are no A-law decoder output values for index numbers 26, 45, 63, etc. Thus, if one of these "virtual" levels correspond to a scaled level (as called for in the above example), then the difference may be unintelligible or excessively high. Consequently, the preferred embodiment analyzes levels that correspond to decoder output number 64 and higher; no levels are skipped from number 64 to number 128.

Referring back to FIG. 5, tasks 518 and 520 may also include the transmission of a suitable identifier to DPCM modem 102. As shown in FIG. 4, codec type identifier 424 may be operatively coupled to transmitter 406 to facilitate the transmission of such an identifier. In the preferred embodiment, modem 102 receives the codec type identifier and, if necessary, can modify a number of processes and/or components according to whether the central office codec 204 follows µ-law or A-law.

It should be noted that the above computation technique is only one exemplary manner in which modem 104 may carry out the present invention. Alternatively, modem 104 may be configured to select a first transmit level designated by a particular subindex, search the remaining transmit levels having the same subindex for particular characteristics, and make a determination depending on the search. Furthermore, the exemplary codec type detection technique described above is immune to the effects of robbed bit signaling (RBS) and digital pads. With respect to RBS, the two levels that are to be compared will have the same least significant bit (LSB) due to their common subindex. If RBS is present, then the LSB of the codeword may be affected. However, since both levels would be affected in the same manner, the characteristic scaling feature is preserved. With respect to the effect of digital pads, they may be considered to perform a "division" operation; digital pads attenuate the transmit levels. Accordingly, because digital pads affect all transmitted codewords, the characteristic scaling feature for A-law levels is preserved.

In summary, the present invention may be employed by a receive modem to enable it to identify whether the encoding law utilized by the central office codec is µ-law or A-law. The codec type detection scheme is based upon the analysis of transmission levels obtained by the receive modem during an initialization routine.

The present invention has been described above with reference to a preferred embodiment. However, those skilled in the art will recognize that changes and modifications may be made to the preferred embodiment without departing from the scope of the present invention. For example, the present invention is not limited to the detection of µ-law and A-law codecs; the techniques can be expanded to any number of different encoding techniques currently known or those that may be developed in the future. In addition, the process tasks described herein are exemplary, and they may be performed in any appropriate order, with or without additional tasks, and by alternate processing components of the system. These and other changes or modifications are intended to be included within the scope of the present invention, as expressed in the following claims.

What is claimed is:

1. A method for identifying an encoding type associated with a central office codec in a digital data communication system, said method comprising the steps of:

obtaining a plurality of transmission levels generated in accordance with an encoding scheme utilized by said central office codec, each of said transmission levels being designated by a segment index and a subindex associated with said segment index;

selecting a first level designated by a first segment index and a subindex;

choosing a second level designated by a second segment index and said subindex;

calculating a difference based on said first and second levels; and identifying an encoding type of said central office codec in response to said calculating step.

2. A method according to claim 1, wherein said identifying step identifies whether said encoding type of said central office codec is µ-law or A-law.

3. A method according to claim 1, wherein:

said selecting step selects said first level, where said first level is designated by segment index N and subindex i;

said choosing step chooses said second level, where said second level is designated by segment index (N+M) and subindex i;

said calculating step comprises the step of multiplying said first level by $2^M$ to obtain a scaled level; and said calculating step calculates said difference based on said scaled level and said second level.

4. A method according to claim 1, further comprising the step of comparing said difference to a threshold, wherein said identifying step is responsive to said comparing step.

5. A method according to claim 4, wherein:

said identifying step identifies that said encoding type is of a first type when said difference is less than said threshold;

said method further comprises the step of comparing said difference to a second threshold; and said identifying step identifies that said encoding type is of a first type when said difference is greater than said second threshold.

6. A method according to claim 4, wherein:

said identifying step identifies that said encoding type is of a first type when said difference is greater than said threshold; and said identifying step identifies that said encoding type is of a second type when said difference is less than said threshold.

7. A method according to claim 1, wherein:

said method further comprises the step of repeating said selecting, choosing, and calculating steps for a plurality of corresponding first and second levels;

each iteration of said calculating step calculates an individual difference;

said method further comprises the step of generating an accumulated difference associated with a plurality of individual differences; and said identifying step identifies said encoding type of said central office codec in response to said accumulated difference.

8. A system for identifying an encoding type associated with a central office codec in a digital communication system, said system comprising:

a database configured to store a set of transmission levels generated in accordance with an encoding scheme utilized by said central office codec, each of said transmission levels being designated by a segment index;

a level selector configured to select a plurality of said segment indexes and to obtain a plurality of said transmission levels corresponding to said plurality of said segment indexes; and a codec type identifier configured to identify a specific encoding type of said central office codec in response to a comparison based upon said plurality of transmission levels.

9. A system according to claim 8, further comprising a level estimator for producing said set of transmission levels in response to a corresponding set of codewords utilized by said encoding scheme.

10. A system according to claim 8, wherein said codec type identifier is configured to identify whether said specific encoding type is µ-law or A-law.

11. A system for identifying an encoding type associated with a central office codec in a digital communication system, said system comprising:

a database configured to store a set of transmission levels generated in accordance with an encoding scheme utilized by said central office codec;

a level selector configured to obtain a plurality of transmission levels from said set of transmission levels, wherein said level selector is configured to select a first level designated by a first segment index and a subindex, and to select a second level designed by a second segment index and said subindex;

a difference generator that calculates a difference based on said first and second levels; and a codec type identifier configured to identify a specific encoding type of said central office codec in response to a comparison based upon said plurality of transmission levels, wherein said codec type identifier identifies said specific encoding type in response to said an difference.

12. A system according to claim 11, wherein:

said first level is designated by segment index N and subindex i;

said second level is designated by segment index (N+M) and subindex i;

said difference generator is configured to multiply said first level by $2^M$ to obtain a scaled level and to calculate said difference based on said scaled level and said second level.

13. A system according to claim 11, further comprising a difference accumulator configured to accumulate a number of individual differences generated by said difference generator in response to number of first and second levels.

14. A system according to claim 11, wherein said codec type identifier is further configured to perform a comparison of said difference to a threshold, and to identify said specific encoding type in response to said comparison.

15. A method of identifying a modulation encoding type, said method comprising the steps of:

receiving a plurality of segments, each segment designating a transmission level;

selecting two or more of said segments;

obtaining two or more transmission levels designated by said two or more of said segments; and analyzing said two or more transmission levels to determine said modulation encoding type;

wherein each segment includes an index and a subindex, and wherein in said selecting step, a first segment index, a second segment index and a subindex are selected, wherein in said obtaining step, a first transmission level corresponding to said first segment index and said subindex and a second transmission level corresponding to said second segment index and said subindex are obtained, and wherein in said analyzing step a subtraction between said first transmission level and said second transmission level is analyzed to determine said modulation encoding type.

16. The method of claim 15, wherein in said analyzing step, a scaled level of said first transmission level is subtracted from said second transmission level to generate a result.

17. The method of claim 16, wherein said analyzing step further includes the step of comparing said result against a threshold to determine said modulation encoding type.

18. The method of claim 15, wherein said receiving step occurs during a digital impairment learning.

19. The method of claim 15 further comprising the step of informing a remote device of said modulation encoding type.

20. A method of identifying a modulation encoding type, said method comprising the steps of:

receiving a digital impairment learning signal, said learning signal including a plurality of transmission points and a plurality of reference points;

processing said plurality of transmission points and said plurality of reference points to obtain a plurality of transmission levels; and analyzing two or more of said plurality of transmission levels to determine said modulation encoding type;

wherein each said point is designated by a segment including an index and a subindex, and wherein in said analyzing step, a first transmission level corresponding to a first segment index and a subindex and a second transmission level corresponding to a second segment index and said subindex are obtained, and a subtraction between said first transmission level and said second transmission level is analyzed to determine said modulation encoding type.

21. The method of claim 20, wherein in said analyzing step, a scaled level of said first transmission level is subtracted from said second transmission level to generate a result.

22. The method of claim 21, wherein said analyzing step further includes the step of comparing said result against a threshold to determine said modulation encoding type.

23. The method of claim 20 further comprising the step of informing a remote device of said modulation encoding type.

24. A device for identifying a modulation encoding type, said device comprising:
- a receiver capable of receiving a plurality of segments, each segment designating a transmission level;
- a processor capable of selecting two or more of said segments, obtaining two or more transmission levels designated by said two or more of said segments, and analyzing said two or more transmission levels to determine said modulation encoding type;
- wherein each segment includes an index and a subindex, and wherein said processor analyzes a subtraction between a first transmission level corresponding to a first segment index and a subindex and a second transmission level corresponding to a second segment index and said subindex to determine said modulation encoding type.

25. The device of claim 24, wherein a scaled level of said first transmission level is subtracted from said second transmission level to generate a result.

26. The device of claim 25, wherein said processor compares said result against a threshold to determine said modulation encoding type.

27. The device of claim 24, wherein said receiver receives said plurality of segments during a digital impairment learning.

28. The device of claim 24 further comprising a transmitter, wherein said transmitter transmits said modulation encoding type.

29. A device for identifying a modulation encoding type, said device comprising:
- a receiver capable of receiving a digital impairment learning signal, said learning signal including a plurality of transmission points and a plurality of reference points;
- a processor capable of processing said plurality of transmission points and said plurality of reference points to obtain a plurality of transmission levels, and analyzing two or more of said plurality of transmission levels to determine said modulation encoding type;
- wherein each said point is designated by a segment including an index and a subindex, and wherein said processor analyzes a subtraction between a first transmission level corresponding to a first segment index and a subindex and a second transmission level corresponding to a second segment index and said subindex to determine said modulation encoding type.

30. The device of claim 29, wherein a scaled level of said first transmission level is subtracted from said second transmission level to generate a result.

31. The device of claim 30, wherein said processor compares said result against a threshold to determine said modulation encoding type.

32. The device of claim 29 further comprising a transmitter, wherein said transmitter transmits said modulation encoding type.

33. The method of claim 15 further including the step of storing said plurality of segments prior to said selecting step.

34. The method of claim 20 further including the step of storing said plurality of segments prior to said selecting step.

35. The device of claim 24 further comprising a memory, wherein said processor stores said plurality of segments in said memory.

36. The device of claim 29 further comprising a memory, wherein said processor stores said plurality of segments in said memory.

* * * * *